Dec. 30, 1969  P. ROBINSON  3,486,221
HIGH ENERGY BEAM TRIMMING OF ELECTRICAL COMPONENTS
Filed June 14, 1967
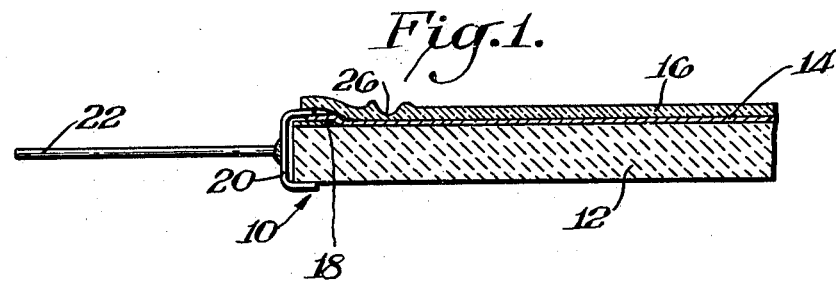
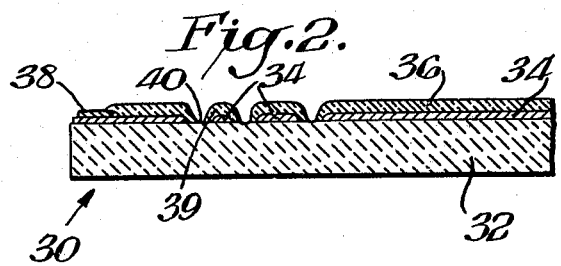
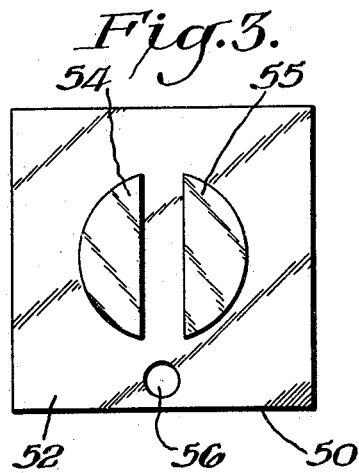

3,486,221
HIGH ENERGY BEAM TRIMMING OF ELECTRICAL COMPONENTS
Preston Robinson, Williamstown, Mass., assignor to Sprague Electric Company, North Adams, Mass., a corporation of Massachusetts
Filed June 14, 1967, Ser. No. 646,002
Int. Cl. H01c 7/00
U.S. Cl. 29—620          7 Claims

ABSTRACT OF THE DISCLOSURE

Electron beam impinging on protectively coated metal film resistor increases its resistance without leaving a gap in the protective coating. Film can be chromium-nickel, preferably on a completely oxidized under layer of chromium-nickel. Completely protected metal film resistor can also be made by machining a film after it is covered by protective coating at least 5000 Angstroms thick and melting at a temperature lower than film. Electron beam or laser beam can do the machining in such a way as to cause the protective coating adjacent machined path to melt and flow over machined edges of film. These high energy beams can also be used in place of ordinary light in photo-resist process to render resist pervious where impinged by the beam, or render resist more resistant to removal where impinged. Such impingement can both make some resist portions pervious as by removing them, and other portions more resistant to removal so that surface under resist is delineated into three areas which can each be subjected to different after treatments.

---

This invention relates to the use of high energy beams such as electron beams and laser beams, in the making of circuit components such as resistors, inductors and transistors.

Surface film devices including resistors and inductances have a thin film of conductive material such as metal coated on a base of ceramic or the like, the film being machined to remove portions so that the remainder has a higher resistance or inductance.

Rapid production of resistors, inductances and semi-conductive devices presents problems in reproducibility, accuracy and flexibility. They tend to show departures from specification limits even though the latest production techniques are used, including electron beam and laser beam machining.

Among the objects of the present invention is the provision of novel production techniques for making the foregoing devices, as well as new products resulting from such techniques.

These as well as additional objects of the present invention will become more apparent from a consideration of the following description of several of its exemplifications, reference being made to the accompanying drawings wherein:

FIG. 1 is a sectional view of a metal film resistor showing a portion treated to correct its resistance in accordance with the present invention;

FIG 2 is a similar view showing a metal film device machined through a protective coating pursuant to the present invention; and FIG. 3 is a plan view of a semiconductor device representative of the present invention and illustrating the use of high energy beams to delineate separate portions that are to be given different treatments.

The present invention produces devices which include metal film resistors in which a non-conducting base such as a ceramic rod is coated with a metal film and thereafter a nonconducting strip is formed by machining away part of the conducting coat in a helical path around the rod. This results in lengthening the resistive path of the remaining conducting material. The conductive material has a resistivity and this resistivity provides the resistance value of the ultimate product. Conductivity and resistivity as used in reference to the surface film type device are relative terms. For example, resistivities can range from below $10^{-3}$ ohm-cm. to about $10^{-6}$ ohm-cm. for silicon, illustrating that in principle a wide range of resistances are possible for this chemical element.

The machining is preferably effected by an electron beam as described in the above-cited parent applications to produce microscopically straight and smooth machined edges. Laser beams can also be used with similar results, the highly concentrated energy of the laser light effecting rapid evaporation of the portions of the metal film against which the laser beam impinges. Machining can also be accomplished with concentrated infrared light such as that generated by iodine-tungsten quartz lamps having gold reflectors.

Instead of machining a helical path in a cylindrical metal film, the metal film can be planar and the path then made a series of offset lines to leave a sinuous electricity conductive track, as more fully illustrated for example in application Ser. No. 544,731, filed Apr. 25, 1966.

FIG. 1 illustrates the latter construction in which a resistor 10 has a support sheet 12 coated with metal resistive film 14 which after machining is covered by a protective coating 16 of fused glass or enamel. Terminal connections are provided by an extra layer 18 of more conductive metal such as gold at the ends of the resistive track, a metal clip 20 being clamped over the edge of plate 12 so as to dig into the resistive film where it laminates with conductive layers 18. A lead 22 can be welded to the clips. Layers 18 can be under or over the resistive film 14, although in the figure they are shown as under it.

The application of protective coating 16 usually changes the effective resistance of the machined film, and the degree of change thus produced is somewhat erratic. According to the present invention the coated resistor is then subjected to an electron beam to cause the beam to impinge upon the coating as well as upon the film covered by it, and to melt and flow at least one of them to increase the resistance of the resistor without leaving a gap in the coating.

In FIG. 1 the portion subjected to the final electron beam treatment is indicated at 26, and here the protective coating is distorted because of the localized melting there caused. It is not necessary to melt the metal film as the localized melting of the coating alone has an appreciable resistance-increasing effect on solid metal films that are thin enough to be suitable for film type resistors. Such films generally have resistances of about 50 to 2000 ohms per square, and chromium-nickel films of this resistance show resistance increases of about 15% where a protective coating 10 mils thick is melted by a one-half second impingement of a 20 kilovolt 100 microampere electron beam focused to a spot 50 mils in diameter.

It may be that some of the metal from the film reacts with or becomes dispersed into the coating, and although the mechanism is not understood, the same effect is noted with other metals including platinum, zinc, iron, copper, silicon, aluminum, manganese, cadmium and tungsten, as well as with chromium and nickel when used separately. It is also noted with any kind of ceramic or other coatings that melt, including plastics like nylon that can be used on resistors. Inasmuch as protective coatings are applied at minimum temperatures, any touch-up melting will produce the resistance-increasing effect even if the touch-up melting barely brings the melt to a flowable condition.

Where the metal film melts under the influence of the electron beam, the effects are even more pronounced, particularly in the thinner films. A nickel-chromium film containing about 10% manganese, 80% chromium and 10% nickel by weight and having a thickness such as to show a resistance of 1200 ohms per square and covered with a 10 mil thick layer of glass, can have its local resistance more than doubled by a one-second exposure to the above 50 mil wide beam. This increase seems to be associated with surface tension effects on the molten film. A low-melting metal film of zinc can in this way be melted through a 2 mil thick layer of polytetrafluoroethylene which is resistant enough to heat up and transfer heat to the underlying zinc although the polytetrafluoroethylene does not itself melt. This action is facilitated by the relatively low concentration of beam energy—about 1000 watts per square inch.

It is preferred that the resistance-adjusting beam be rather diffuse, at least about 10 mils wide, so that a localized adjustment will be a significant increase for the entire resistor. The adjusting effect can be multiplied by repeating the electron beam exposure in other locations of the resistor or scanning the beam along it. A scan that extends transversely to the resistive track has a greater effect than one extending longitudinally of the track.

The foregoing adjustment of resistance is also effective with resistors that are not machined. For example, a gold film deposited by firing a gold resinate layer on a glazed ceramic substrate, and having a resistance of 1500 ohms per square, can be protected by a 3 mil thick layer of glass fused to the metal, and the resistance then adjusted by a one-half second exposure to a 10 watt electron beam 100 mils wide.

According to another aspect of the present invention, a protected machined metal film resistor, inductor, capacitor or circuit component having one or more of such elements or a combination of different elements, is provided by machining a body having a precursor metal film covered by a fusible protective coating and machining the film with a high energy beam that fuses the coating adjacent the machined path and causes the fused coating to flow over and cover the machined edges of the film.

Referring to FIG. 2, there is here shown a metal film planar resistor 30 having a ceramic support 32 that carries a chromium-nickel-aluminum film 34 having a resistance of 1300 ohms per square which is in turn coated with a 5 mil thick layer of vitreous enamel 36. Terminals for the film 34 are provided by a covering stratum 38 of pure nickel electroplated over each end of the film 34. At these nickel strata the resistance is 8 to 12 ohms per square and terminals can be welded or soldered there with high temperature solder.

The resistor is now machined to provide a series of parallel cuts 39 in the film 34 to leave the film as a sinuous track having a total resistance of 1 megohm between its terminals. The machining is effected by a 20 kilovolt 150 microampere electron beam focussed to a spot 3 mils in diameter and scanning at a speed of 30 inches per minute. Under these conditions the beam volatilizes the coating film and a small amount of the ceramic base 32 along the 3 mil machining path. The coating is also fused adjacent the machining path and enough flow takes place in the fused edges that they flow together as indicated at 40, completely covering the machined path.

By conducting the scanning at a higher speed, such as 1 inch per second using a beam of 300 microamperes, the fused flow is less and will still cover the machined edges of the film, although the fused edges of the protective coating might not flow together at all points. Even higher scan speeds will provide adequate flow to protect the machined film edges, but reducing the thickness of the protective coating to less than about 5000 Angstroms will not provide adequate flow with any practical machining width—that is with a beam 5 mils or less in width.

Chromium-nickel films whether or not they contain other ingredients such as manganese, aluminum, silicon and/or copper, show more stable resistance values when they are applied over a fully oxidized layer of chromium-nickel. Thus a steatite disc on which is vacuum condensed, gas-plated or sputtered an 80 weight percent Cr–20 weight percent nickel film having a resistance of 1000 ohms per square, can have this film completely oxidized by heating in air at 600° C. for about two hours, or by heating in oxygen at 500° C. for about one and one-half hours. Depositing another such metal film over the oxidized layer provides a resistance film which even after machining shows very little change in resistance upon prolonged use. Completely oxidized base layers 25 to 100 Angstroms, with chromium contents varying from 40% to 95% by weight thick before oxidizing, have this effect.

The completely oxidized base layers also help the fused protective coating 40 of FIG. 2 flow over and cover the machined edges of metal films applied on these base layers. It is accordingly particularly desirable to use such base layers in the combination of FIG. 2.

The flow protecting technique illustrated in FIG. 2 is also obtained when the machining is performed with other high energy beams such as laser beams. Because laser beams generally have less energy per unit area of impingement, their scanning rate is slower and there is a greater lateral dissipation of heat to fuse the edges of the protective coating.

The flowing of the protective layer takes place whether the resistor being machined is kept stationary, or is moved as in the helixing operation described in the parent applications. Also the metal film can be machined to make an inductor or subdivide the film into capacitively linked portions. Any metal can be used inasmuch as they are all vaporized by high-energy beams, even tungsten. Similarly any protective layer can also be vaporized and will be suitable so long as it fuses. Glass protective layers are desirable, particularly of hard or more difficultly fusible glasses such as the borosilicate types where the circuit component is a resistor that generates appreciable heat in use. Transparent glass coatings enable visual inspection of the protected film, and this is very desirable for detecting defects such as for example a conductive track that is too narrow in one or more locations to be dependable.

It is a feature of the present invention that the high intensity beams can be used to also adjust circuit combinations such as an RC network or an LC network.

The beam treatments will increase resistances and they also decrease capacitances. Where a resistance-capacitance network is used to determine a time constant in a circuit, the determination is made by the product of the resistance and the capacitance. Accordingly where the time constant needs increasing the resistance is increased by the beam treatment, and where the time constant needs decreasing the capacitance is decreased by the beam treatment. Excessive changes should be avoided where the impedance of the circuit is important.

In inductance-capacitance networks the capacitances are readily decreased as pointed out above, and the inductance can be increased by the machining operation as carried out with a resistor. The critical aspect of an inductance-capacitance network is also the product of the inductance and the capacitance so that a similar adjustment or tuning of such a network is readily effected.

Inductances can also be diminished pursuant to the present invention. To this end a helical or planar inductor can have its turns covered by a coating containing particles of high magnetic permeability, and the adjustment made by machining out portions of the coating. This has the effect of reducing the inductance.

A similar technique can be used to increase the inductance of an inductor, except that instead of incorporating high permeability material in the coating, the coating can be of highly conductive material insulated from the turns of the inductor. The highly conductive coating, which can for example be a copper or silver foil or a vacuum-distilled layer of such metal, has an inductance-reducing effect and by machining away portions of such coatings the inductance will increase.

The high energy beams will easily cut through protective coatings, and by diminishing their intensity or impingement dwell they will also impart other effects to coatings. Where the coatings are of the photo-resist type, for example, the beams can rapidly convert such a coating to the very insoluble form which it assumes to delineate the coated material into three different portions. In one portion the coating is not affected and this is accomplished by keeping the beam from impinging on the corresponding parts of the coating. In a second portion the coating is removed by the high-energy beam or decomposed by that beam to the point it becomes pervious. The remaining portions of the coating are rendered by the beam more resistant to removal as by a solvent.

The subdivision into three different types of areas enables simpler manufacture of circuit elements and devices. For example a support carrying a single electrically conductive film covered by a layer of resist as described in the example of U.S. Patent 2,670,285, can be scanned by an electron beam that cuts through the resist and the film to convert it to a sinuous resistance element, and this scanning can be followed by additional scanning with much lower energy impingement per unit area to harden all the remaining resist except where terminals are to be provided for the resistance element. The unhardened resist is removed from the film by the usual development, and the thus exposed film sites electroplated with copper to provide good solder terminals.

Alternatively the first portion of the beam scanning can be only intense enough to cut through or decompose the resist and the film then etched through as by anodic treatment in a very dilute solution of an acid like HCl, not strong enough to remove the unhardened or hardened portions of the resist. This leaves sites still protected by the unhardened resist which is removed for coating or plating of the sites to make appropriate terminals after the etched areas are given some intervening treatment.

FIG. 3 illustrates such a technique used in the making of a transistor. A silicon chip 50 having an in situ formed silicon dioxide surface and a p-type conductivity, is here shown as carrying a resist layer that has been segregated into three regions by an electron beam. One region 52 has been hardened by a 20 kilovolt 10 microampere beam 8 mils wide scanning at a rate of 150 inches a second. A second region is composed of two portions 54, 55 in which the resist has not been touched by the beam. The third region is area 56 where the beam current was increased to 100 microamperes and the beam width reduced to ½ mil; here the resist has been completely driven off and some of the underlying oxide volatilized with it.

The chip is now etched with aqueous ammonium bifluoride as described in U.S. Patent 3,122,817, granted Mar. 3, 1964, to remove residual $SiO_2$ from area 56 and this area is then plated with gold by vacuum condensation to build up a thickness of about 0.01 mil.

The resist is now developed to wash it away from areas 54, 55, the $SiO_2$ is etched away, and the chip then subjected to diffusion with phosphorus to give areas 54, 55 n-conductivity. The diffusion extends out in all directions from the margins of areas 54, 55 and is carried out long enough to form the desired pair of junctions between these areas. Another plating step is now carried out to deposit terminal coatings on areas 54, 55. After the plating the resist is easily removed from region 52 inasmuch as the heat of the diffusion treatment extensively decomposes this resist. The silicon dioxide at region 52 is also removed taking along with it any terminal deposit that extends beyond its intended boundary.

A similar result is obtained by scanning a high energy beam across a silicon chip that has been coated with a phosphate glass or with a phosphorus-containing silica glass or other phosphorus-containing layer. Such a coating can be applied at fairly low temperatures under conditions which keep the body of the silicon from becoming contaminated. The beam treatment can then be intense enough to cause momentary heating of the silicon to a temperature at which a significant phosphorus diffusion takes place from the coating into the thus heated portions. Not more than a few seconds are needed to obtain the desired diffusion of any one point of the chip, so that the scan speed can be correspondingly set, using beams of fairly moderate intensity—for example a 10 kilovolt 50 microamperes beam 6 mils wide. Where the chip is to have its coating removed or made pervious, the scanning speed and beam intensity are increased to cause extremely rapid treatment that does not give the phosphorus an opportunity to significantly diffuse into the chip. Moreover the beam can be readily controlled to almost instantaneously machine through the coating without heating the chip to a diffusion temperature.

Boron oxide coatings can be used in the same way to effect diffusion of p-conductivity impurities in the chip.

Other coatings that can be used for the three-way delineation include low polymeric silicon oxides, $Si_3N_4$, SiS and $SnO_2$, or simple phosphates and arsenates like sodium phosphate and gallium and indium salts, where doping is to be effected by the coating. Beams of moderate intensity cause the low polymeric materials to become more highly polymerized and therefore more inert and less soluble in solvents.

Laser beams can be used in place of the electron beams in the process described in connection with FIG. 3. For sharpest resolution, as in the making of high frequency transistors and the like, electron beams are preferred inasmuch as they can be very sharply defined and scanned to closely and accurately space adjacent treatment zones.

The techniques of the present invention can be applied to germanium or other substrates in place of the above-mentioned silicon. Carbon is another material that can be machined by high energy beams, preferably in an oxidizing atmosphere. A little residual oxygen in the evacuated electron beam treatment chamber permits a carbon layer to be rapidly cut, most of the carbon becoming oxidized.

The start of a non-conducting path is accurately controllable as is also the ending or the termination of the non-conducting path cut by a beam. These operations are simply achieved by deflecting onto or away from the substrate, by focusing or defocusing at the appropriate instant in time, or by appropriately coordinating a beam current modulation with the scan.

The high energy beams cut through the desired layers and also reach the support thus exposed, heating it momentarily. This heating can be to the fusing point so that a skin of glazed material is formed on ceramics. The surface of the non-conducting path can in this way be made free from irregularities and imperfections and microscopically smooth. The beams can also make a very shallow cut into the support. This cut is preferably to the depth of less than 0.0005 inch.

The support material may be beryllium oxide. Beryllium oxide is undesirable as a substrate core for mechanical machining because of the toxicity of its dust. However, with the techniques of this invention beryllium oxide dust is not formed, and the high thermal conductivity of beryllium oxide is particularly effective in increasing the wattage rating for a given hot spot temperature in a resistor. Such resistors show more uniform temperatures and the temperature rise above ambient is limited or maintained at a minimum.

Ceramic metallic (cermet) films provide desirable electrically conductive surface films but present problems in the technique of adjusting the resistance value for an ultimate useful product. The ceramic metallic material after application to the non-conducting base is tenaciously adhesive to the base. The resistance adjusting technique of this invention is particularly applicable to this problem. For example, a cermet of 65% chromium and 35% silicon monoxide as a surface film can be readily adjusted to a desired final resistance by the means and method described herein. Another good resistance material made useful as an adjustable surface film by this invention is molybdenum disilicide.

Another product of this invention is a surface film type inductor. A surface inductor is made up of a conductive film such as either silver or copper deposited on an elongated, round or bar-like, non-conducting base and formed into a number of closely spaced turns of a conducting track by a non-conducting path produced in the metallic coat by impingement of an electron or laser beam. As in the case of the resistors described above, the conductive material removed to provide the non-conducting path, is volatilized and removed from the vacuum furnace by suction.

An advantageous example of an inductance prepared according to this invention is the provision of a silver coat on a magnesium oxide core. The silver coat is transformed into a spiral conductor by forming a non-conducting path with the electron beam. The silver conducting layer is particularly adapted to effect cutting by removal with the electron beam.

The present invention is also applicable to the making of capacitors such as those having metal film coatings on one or both faces of a dielectric support. Such coatings lend themselves to beam machining for adjustment of the capacitance between them. For example where a support has coatings on opposite faces, one or both coatings can be machined away to reduce their opposing areas and thus diminish their capacitance. Where such coatings are on the same surface of a support and form a capacitor by reason of the edge effect capacitance between their adjacent edges, the capacitance can be diminished by machining away a strip on one or both of these edges. Very little film removal is needed for such edge-effect adjustment as compared with the area removal for opposing area adjustment.

Combinations of circuit components such as RC or inductively tuned timing circuits can also be adjusted pursuant to the present invention. In some circuits (see for example U.S. Patent 3,109,983, granted Nov. 5, 1963) a single coating of relatively high resistance acts as both a capacitance electrode and a resistor, and this coating can have its resistance adjusted in accordance with the techniques of FIG. 1 or FIG. 2 of the present invention. Film-type inductors can also be adjusted as by machining away portions of the film, or where the inductor is to have significant resistance, by increasing that resistance pursuant to the technique of FIG. 2.

Inductors can have coatings of high permeability to increase their inductance, and these coatings can be subjected to beam action to change the inductance as by being partly machined away. Such machining can be arranged to only partially penetrate through high permeability coatings if it is desired to retain whatever protection is obtainable from such coatings which can consist of iron or ferrite powder in a protective resin binder.

The conductive films used can be of any metal, preferably one that is relatively non-reactive and stable. In addition to noble metals, transition metals are suitable, particularly when alloyed with another metal such as a noble metal. Alloys of gold and vanadium, or palladium and sliver, for example, are highly suited for resistance films.

The treatment described in connection with FIG. 1 has a tendency to cause an increase in electrical noise or "shot" noise of the component treated. Where such noise is a significant problem this treatment should be held down to the minimum.

In the modification of FIG. 2, all exposure of the conductive film is avoided. For some purposes, however, the machined edges of this film can be permitted to remain partially or completely exposed. In such product the percentage of exposure of the resistor material is quite small inasmuch as the exposed edge is almost dimensionless, and the sensitivity to exposure is also quite small.

According to an additional aspect of the invention circuit components may have a protective surface applied as by polymerizing a gas such as butadiene or low molecular weight silicones in the atmosphere in which the machining is performed. For example, an electron beam chamber may hold a gas which reacts to form a protective layer on the conductive or semiconductive material. The heating effect of the beam readily causes reactions to take place at the machining site as the beam scans. The machining chamber atmosphere can also contain a mixture of gases such as silanes and water vapor or silanes and ammonia, that react with each other at the hot beam impingement sites to form protective coatings.

An important advantage of the high energy beam helixing is the smooth edge of the path when it is cut. With mechanical helixing a jagged edge is formed. This is undesirable since it produces sharp points which can be areas of electrical stress concentration. These areas of concentration are points at which break-down can start. The shape and stability of the conducting path are important. The beams provide a very even or smooth edge conducting path. This is demonstrated in the control of the magnetic field at the edge of a superconductor. In a superconductor if the flow along the edge is not disturbed by the irregularity of the edge, the superconductive phenomenon is preserved. With the beam machining a smooth edge is provided so that the conducting path has the desired straight shape and preserves the superconductivity. Pulsed machining beams are not desirable because they tend to leave machined edges with scallops containing sharp points.

The high energy beams can also be arranged to cut partly or completely through a transistor or diode slice or chip to delineate it into smaller units, or to help electrically isolate one region from another or to sever the units from each other. Such partial or complete cutting can also be performed after the chip or slice has been imbedded in a retaining body such as a glass layer as described in the Duke application Ser. No. 638,861, filed May 16, 1967.

Aluminum makes a desirable conductive film in accordance with the present invention, particularly on ceramic supports. Aluminum adheres very tenaciously to such supports, and can be readily provided with solderable top coatings such as an aluminum-copper mixture which is in turn covered by pure copper.

While the use of high intensity beams in accordance with the present invention is called "machining," the action of these beams can be considered as essentially thermal rather than mechanical. An electron beam does exert substantial pressure on any surface on which it impinges, and this pressure makes itself evident by the piling up of the sides of a fusible layer bombarded with an electron beam, particularly when the layer is not readily volatilized. Thin layers carried by a solid surface which the layers do not wet very effectively when molten, have a tendency to be drawn away from the beam impingement track and coalesce into a lip or into small balls by surface tension effects. Layers of gold or copper on glass behave in this way. Continuous (non-pulsating) beams having an intensity of about 50,000 watts per square centimeter or more, cause such rapid evaporation that very little surface tension action is noted unless the films are quite thick. Such powerful beams produce strong pressure effects, however.

Where a film readily wets the surface on which it is carried, the electron or laser beam will cause volatilization along the impingement track but will permit the molten film edges to flow at least part way back into the track after the beam has passed. Some metals such as chromium and aluminum behave in this way on glass substrates. The glass-type protective coatings described above also easily wet ceramic substrates and show such flow-back very effectively.

Some thin films like chromium can in fact be evaporated out into or through a glass covering layer by an electron beam impinging on the glass layer, without evaporating off much of the glass layer. This action takes place in the resistance adjusting process described in connection with FIG. 1.

Obviously many modifications and variations of the present invention are possible in the light of the above teachings. It is, therefore, to be understood that within the scope of the appended claims the invention may be practiced otherwise than as specifically described.

What is claimed is:
1. In the process of making a coated metal-film resistor, the improvement according to which the coated resistor is initially made to have a resistance lower than desired and the coated resistor is then subjected to an electron beam to cause the beam to impinge upon the coating as well as upon the film covered by it, and to melt and flow at least one of them to increase the resistance of the resistor without leaving a gap in the coating.
2. The combination of claim 1 in which the coating melts at a temperature below that at which the metal film melts.
3. The combination of claim 1 in which the resistor has a ceramic support for its metal film.
4. The combination of claim 1 in which the metal film is a chromium-nickel film.
5. A process for preparing a protected machined metal film electric circuit component, said process including the steps of providing a circuit component body having a metal film covered by a fusible protecting coating at least about 5000 Angstroms thick, and machining the film with a high energy beam that fuses the coating adjacent the machined path and causes the fused coating to flow over and cover the machined edges of the film.
6. The process of claim 5 in which the metal film is a chromium-nickel film and the circuit component includes a resistor in which said film supplies the resistance.
7. The process of claim 6 in which the metal film is coated on a completely oxidized chromium-nickel layer.

References Cited
UNITED STATES PATENTS

| | | | |
|---|---|---|---|
| 3,140,379 | 7/1964 | Schleich et al. | 219—69 |
| 3,293,582 | 12/1966 | Robinson | 219—121 |

JOHN F. CAMPBELL, Primary Examiner

J. L. CLINE, Assistant Examiner

U.S. Cl. X.R.

219—69, 121

UNITED STATES PATENT OFFICE
CERTIFICATE OF CORRECTION

Patent No. 3,486,221      Dated December 30, 1969

Inventor(s) Preston Robinson

It is certified that error appears in the above-identified patent and that said Letters Patent are hereby corrected as shown below:

Column 2, line 24, change "electricity" to -- electrically --
Column 4, line 15, change "100" to -- 1000 --
Column 7, line 74, change "sliver" to -- silver --
Column 10, line 24, change "3,293,582" to -- 3,293,587 --

Signed and sealed this 7th day of July 1970.

(SEAL)
Attest:

EDWARD M. FLETCHER, JR.          WILLIAM E. SCHUYLER, JR.
Attesting Officer                 Commissioner of Patents

PO-1050
(5/69)

UNITED STATES PATENT OFFICE
CERTIFICATE OF CORRECTION

Patent No. 3,486,221      Dated December 30, 1969

Inventor(s) Preston Robinson

It is certified that error appears in the above-identified patent and that said Letters Patent are hereby corrected as shown below:

Column 2, line 12, change "the above-cited parent applications" to -- U.S. Letters Patent 3,375,342 issued March 26, 1968 and application S.N. 272,626 filed March 4, 1963, and now abandoned --

SIGNED AND
SEALED
OCT 20 1970

(SEAL)
Attest:

Edward M. Fletcher, Jr.
Attesting Officer

WILLIAM E. SCHUYLER, JR.
Commissioner of Patents